C. KRSIEN.
STEERING MECHANISM.
APPLICATION FILED MAR. 13, 1912.
1,087,591.
Patented Feb. 17, 1914.
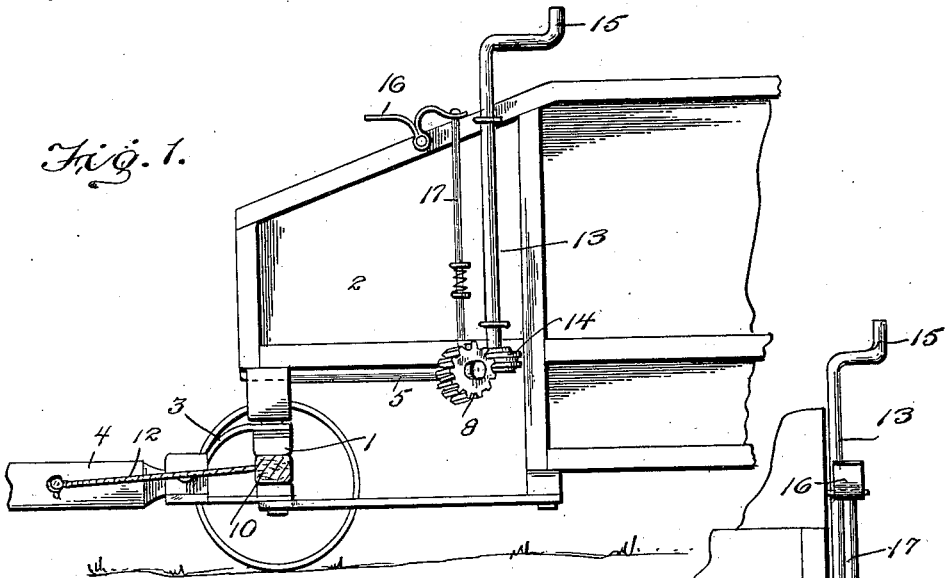
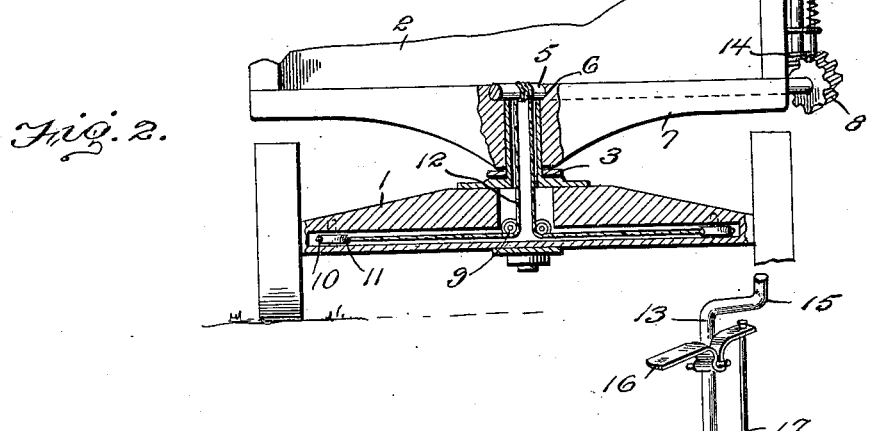
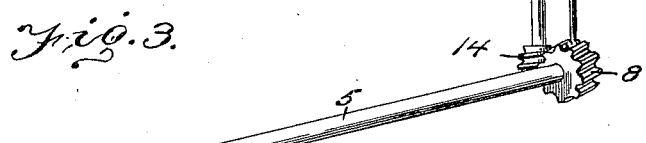
Inventor
Charles Krsien.
Witnesses
By
Attorneys.

UNITED STATES PATENT OFFICE.

CHARLES KRSIEN, OF HUTCHINSON, MINNESOTA.

STEERING MECHANISM.

1,087,591.  Specification of Letters Patent.  Patented Feb. 17, 1914.

Application filed March 13, 1912. Serial No. 683,549.

*To all whom it may concern:*

Be it known that I, CHARLES KRSIEN, citizen of the United States, residing at Hutchinson, in the county of McLeod and State of Minnesota, have invented certain new and useful Improvements in Steering Mechanism, of which the following is a specification.

This invention has relation to steering mechanism especially adapted to be applied to threshers and similar machines for the purpose of steering the front or pivoted axle of the same in order that the machine may be turned or moved around in limited spaces.

The device consists in providing the pivoted axle with pulleys about which cables are trained. The said cables are connected with the opposite sides of a tongue which is pivoted to the axle. The axle is pivotally connected with the frame of the machine and means is provided for moving the cables, whereby the axle is swung to a desired angle with relation to the long dimension of the tongue, or conversely the tongue is swung with relation to the axle.

For a full understanding of the invention reference is to be had to the following description and accompanying drawing, in which:

Figure 1 is a side elevation of the forward part of a thresher with the steering mechanism applied; Fig. 2 is a front elevation of the steering mechanism with parts in section; Fig. 3 is a perspective view of the active parts of the steering mechanism.

Corresponding and like parts are referred to in the following description and indicated in all the views of the accompanying drawing by the same reference characters.

As illustrated in the accompanying drawing the axle 1 is pivoted to the frame of a thresher or similar machine indicated in general at 2. A socket member 3 is pivoted to the axle 1 and a tongue 4 is pivoted in the said socket member. One end portion of a shaft 5 is journaled in a recess 6 provided in the upper part of the bolster 7 which constitutes a portion of the frame of the thresher 2. The outer portion of the shaft 5 is disposed at the side of the body of the thresher 2 and a worm wheel 8 is fixed upon the outer portion of the said shaft. The axle 1 is hollow and pulleys 9 are journaled at the intermediate portion thereof. These pulleys are disposed approximately in vertical planes. The axle 1 is provided at its forward side with openings 10 in which are journaled approximately horizontal pulleys 11. A cable 12 is wound at its intermediate portion about the shaft 5 and extends down under the pulleys 9 and from the said pulleys extends toward the ends of the axle 1. The end portions of the cable 12 pass around the pulleys 11 and through the openings 10 and are connected to the opposite sides of the tongue 4 in advance of the socket member 3. It will therefore be seen that when the shaft 5 is turned the said cable is wound thereon, whereby it is moved longitudinally and as one end portion is wound on the shaft the other end unwinds from the shaft. Consequently the axle 1 is swung with relation to the tongue 4. In other words, the axle 1 is disposed normally at a right angle to the long dimension of the tongue, but by turning the shaft 5 and moving the cable as indicated the said axle may be disposed at an acute angle to the long dimension of the tongue. This will facilitate the turning of the thresher or machine in limited space.

A shaft 13 is journaled at the side of the thresher 2 and is provided at its lower portion with a worm 14 which engages the worm wheel 8. The shaft 13 is provided at its upper end with a crank 15. A foot treadle 16 is pivoted upon the frame of the thresher 2 and a rod 17 is pivoted to the said treadle and is adapted to engage the worm wheel 8. The rod 17 normally engages the wheel 8 and holds the same against rotation and also holds the shaft 5 against rotation. When the treadle 16 is depressed the rod 17 disengages the wheel 8 and by turning the shaft 13 the worm 14 rotates the worm 8 and the shaft 5.

Having thus described the invention, what is claimed as new is:

1. A steering mechanism including a bolster, an axle pivoted beneath the bolster, a tongue pivoted between the axle and bolster, said bolster, tongue and axle being provided with vertically alined recesses, said axle being further provided with a longitudinally extending recess communicating with the vertical recess and with its ends opening through the front of the axle, a shaft journaled in the bolster and with one end extending within its recess, a plurality of pulleys mounted in the recesses of the axle, a cable having its intermediate portion wound about the portion of the shaft within the recess and having its end portions passed downwardly through the vertically alined recesses and oppositely extended through the longitudinal recess, said cable being trained about the pulleys and the free ends of the cable being passed through the openings in the front of the axle and secured to opposite sides of the tongue at a point considerably in advance of its pivotal point, and means for rotating said shaft.

2. A steering mechanism comprising a pivoted axle, a tongue pivoted to the axle, a cable connected at its ends to the opposite sides of the tongue and trained through the axle and the pivot of the axle, and means for moving the cable.

In testimony whereof I affix my signature in presence of two witnesses.

CHARLES KRSIEN. [L. S.]

Witnesses:
O. W. LUNDSTEN,
GEO. A. SIRWRIGHT.

Copies of this patent may be obtained for five cents each, by addressing the "Commissioner of Patents, Washington, D. C."